July 24, 1928.
W. J. McLAUGHLIN
1,677,976
METHOD FOR DELACTATING DAIRY PRODUCTS
Filed June 22, 1925
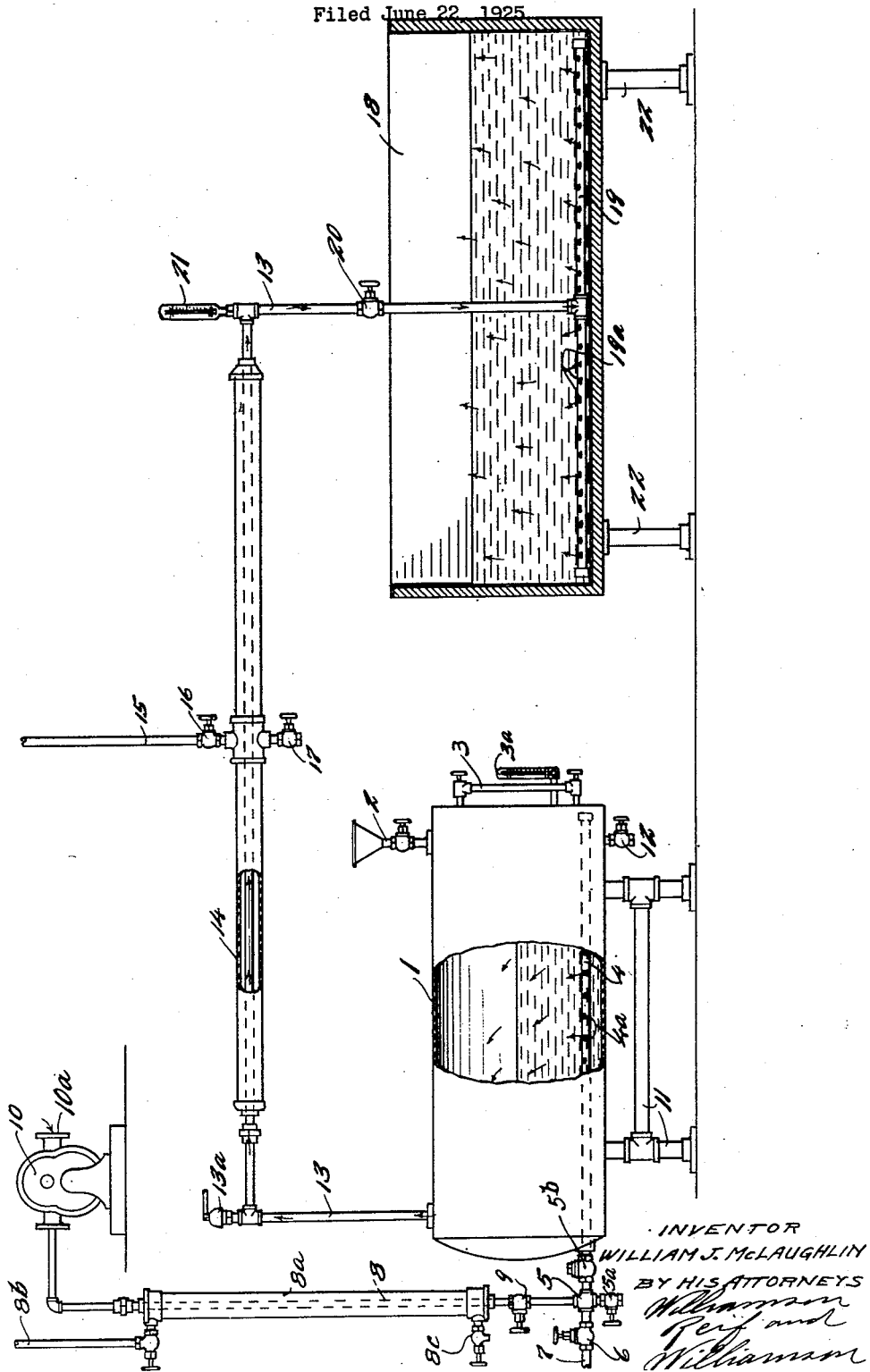
INVENTOR
WILLIAM J. McLAUGHLIN
BY HIS ATTORNEYS Patented July 24, 1928.

1,677,976

UNITED STATES PATENT OFFICE.

WILLIAM J. McLAUGHLIN, OF OWATONNA, MINNESOTA.

METHOD FOR DELACTATING DAIRY PRODUCTS.

Application filed June 22, 1925. Serial No. 38,785.

This invention relates to a process and apparatus for delactating cream and other dairy products and removing odors and undesirable flavors therefrom. Cream and other dairy products often are contaminated with odors originating from the food of the cattle as well as odors absorbed during the handling of the product. These odors are more noticeable and accentuated if the cream becomes old or is slightly soured and the content of lactic acid increased. It is desirable from the standpoint of flavor and odors, as well as from the standpoint of keeping qualities of the product that the content of lactic acid be low.

It is an object of this invention, therefore, to provide a process and apparatus involving the use of a heated mixture of air and carbonic acid gas or other suitable gas which is passed through the cream or other dairy product in a multiplicity of fine jets.

It is a further object of the invention to provide a process in which bicarbonate of soda is mixed with hot water in a generating tank to form carbonic acid gas and in which air is blown through this tank to drive off the mixture of said gas and air, said mixture then being heated to from 140 degrees F. to 200 degrees F. and then passed through the cream or other dairy product.

It is also an object of this invention to provide a simple and efficient apparatus for carrying out the process above set forth.

It is more specifically an object of the invention to provide an apparatus comprising a substantially closed tank in which hot water and bicarbonate of soda are contained, a blower connected to said tank, a conduit leading from said tank for a passage of mixed air and gas, a casing surrounding said conduit, means for passing steam through said casing, a receptacle adapted to contain the cream or other dairy product and a perforated pipe extending throughout said receptacle connected to said conduit.

These and other objects and advantages of the invention will be fully set forth in the following description made in connection with the accompanying drawing, in which the single view represents somewhat diagrammatically one form of apparatus used to carry out the process herein disclosed, said view being partly in side elevation and partly in vertical section.

Referring to the drawing, a tank 1 is shown which is illustrated as of cylindrical shape substantially closed and having a valve controlled filling pipe and funnel 2. A water gauge 3 is provided at one end of the tank and a thermometer $3^a$ is provided at said end communicating with the interior of the tank. A pipe 4 enters the other end thereof adjacent the bottom. The pipe 4 within the tank 1, is provided with a multiplicity of closely spaced holes $4^a$. A T 5 is connected to pipe 4, the opposite end of which is connected to a valve 6 from which extends a pipe 7 adapted to be connected to a suitable source of steam supply. A pipe 8 connects with T 5 and has a valve 9 disposed therein, which pipe 8, at its other end, is connected to the outlet of a blower member 10, the inlet of which is shown at $10^a$, which blower is adapted to be driven by any suitable motor. A casing $8^a$ surrounds pipe 8 and has a valve-controlled steam inlet pipe $8^b$ at its top and a steam outlet or drain pipe $8^c$ at its lower ends. A bleeder valve $5^a$ is connected to the bottom of the T 5, and a check valve $5^b$ preventing flow of liquid away from tank 1 is disposed between tank 1 and T 5. A blow-off valve $13^a$ is located at the upper end of pipe 13. The tank 1 is supported upon a suitable frame 11 and has a drain cock 12 connected to its bottom adjacent one end therof. The pipe or conduit 13 extends from the top of tank 1 adjacent one end and is shown as extending horizontally above the tank. The conduit 13 is surrounded by a casing 14 of considerable greater diameter through which steam is supplied through a pipe 15 controlled by a valve 16. A valve controlled outlet or drain pipe for the casing 14 is also shown at 17. A receptacle 18 is provided adapted to form a vat or container for the cream or other dairy product treated and said receptacle 18 has one or more pipes 19 extending longitudinally thereof and at the bottom thereof, which pipes are provided on their upper sides with a multiplicity of spaced apertures $19^a$. In one commercial embodiment of the invention, the holes $19^a$ have been made $\frac{5}{16}$ of an inch in diameter and spaced two inches apart. The pipes 19 is connected through a suitable T connection with the pipe 13, the latter having a valve 20 disposed therein. A thermometer 21 is also provided in pipe 13. Receptacle 18 is shown supported upon suitable legs 22.

In practicing the process and in the operation of the apparatus, water will be placed in the tank 1 as indicated, together with a certain amount of bicarbonate of soda or other gas producing chemical, and the valve in the filling member then closed. Valve 20 will also be closed, as will also valve 9. The valve 6 will then be opened and hot clean steam will be turned into pipe 4 and will issue through the perforations 4$^a$. This steam will heat the water and mixture of bicarbonate of soda in tank 1 so that a gas will be generated. After the water has been sufficiently heated in tank 1, valve 6 will be closed and valves 9 and 20 opened as well as valve 16. Steam will also be supplied to casing 8$^a$ through pipe 8$^b$. The blower 10 will now be operated and air will be blown through the liquid in tank 1 and this air will be heated in casing 8$^a$ and will then pass into tank 1 through pipe 4 and be mixed with the gas generated in tank 1 and will pass out through conduit 13. The mixture in conduit 13 will be heated by the hot steam in casing 14 and will pass into pipe 19 at the bottom of receptacle 18 and will issue through the holes 19$^a$. This hot mixture of gas and air passing through the cream, or other dairy product, effectively removes objectionable odors therefrom and will greatly reduce the proportion of lactic acid. The process is applicable to cream which is to be used for butter making and has also been found, in practice, to have a high degree of efficiency in treating milk or cream used in making ice cream. The mixture of the generated gas and air is heated from 140 degress F. to 200 degrees F. The treatment also greatly reduces and practically eliminates the bacteria in the milk or cream treated. A large volume of mixture of air and gas is blown through the treated product. Various compounds of ammonia and sodium may be used instead of bicarbonate of soda and other gas producing chemicals may also be used. The amount of the gas producing chemical used will vary with the condition of the material.

The temperature of the material in tank 1 can be seen on thermometer 3$^a$, and the pressure in said tank will be limited by valve 13$^a$. The drain valves 8$^c$, 17 and 5$^a$ may be operated as desired.

From the above description it is seen that applicant has provided a simple and efficient method and apparatus for improving the condition of milk, cream and other dairy products, removing the objectionable odors and flavors as well as the bacteria therefrom and reducing the content of lactic acid therein. The process and apparatus have been amply demonstrated in actual practice and have been found to be very successful and efficient.

It will, of course be understood, that various changes may be made in the form, details, arrangement and proportions of the apparatus and in the steps and sequence of the method without departing from the scope of applicant's invention, which, generally stated, consists in a method and apparatus capable of carrying out the objects above set forth, such as disclosed and defined in the appended claims.

What is claimed is:

1. The process of preparing, mixing and purifying gas and air for introduction into milk to aerate the same, consisting of mixing a gas producing chemical with clean water in a closed vessel, introducing steam into the bottom of the vessel to produce the gas and heat the same, introducing heated air into the bottom of the said vessel to cleanse the air, mix the same with the gas and to drive off the mixture and force the same into the milk.

2. The process of preparing, mixing and purifying gas and air for introduction into milk to aerate the same, consisting of mixing a gas producing chemical with clean water in a closed vessel, introducing steam into the bottom of the vessel to produce the gas and heat the same, introducing heated air into the bottom of the said vessel to cleanse the air, mix same with the gas and to drive off the mixture and heating the driven off mixture to from 140° to 200° F. before introduction into the milk.

In testimony whereof I affix my signature.

WILLIAM J. McLAUGHLIN.